(12) United States Patent
Puscasu

(10) Patent No.: US 12,501,526 B2
(45) Date of Patent: Dec. 16, 2025

(54) METHOD FOR CONTROLLING A LIGHTING SYSTEM OF A MOTOR VEHICLE

(71) Applicant: VALEO VISION, Bobigny (FR)

(72) Inventor: Onoriu Puscasu, Bobigny (FR)

(73) Assignee: VALEO VISION, Bobigny (FR)

( * ) Notice: Subject to any disclaimer, the term of this patent is extended or adjusted under 35 U.S.C. 154(b) by 68 days.

(21) Appl. No.: 17/997,700

(22) PCT Filed: May 5, 2021

(86) PCT No.: PCT/EP2021/061890
§ 371 (c)(1),
(2) Date: Nov. 1, 2022

(87) PCT Pub. No.: WO2021/224340
PCT Pub. Date: Nov. 11, 2021

(65) Prior Publication Data
US 2023/0164894 A1  May 25, 2023

(30) Foreign Application Priority Data

May 5, 2020 (FR) ........................................ 2004450

(51) Int. Cl.
*H05B 45/30* (2020.01)
*B60Q 3/60* (2017.01)
(Continued)

(52) U.S. Cl.
CPC ............. *H05B 45/325* (2020.01); *B60Q 3/60* (2017.02); *B60Q 3/82* (2017.02); *H05B 45/59* (2022.01)

(58) Field of Classification Search
CPC ...... H05B 45/30; H05B 45/32; H05B 45/325; H05B 45/33; H05B 47/10; B60Q 3/60; B60Q 3/80; B60Q 3/82
See application file for complete search history.

(56) References Cited

U.S. PATENT DOCUMENTS

2005/0134197 A1* 6/2005 Lee .................. H05B 45/00
  315/307
2006/0149607 A1  7/2006 Sayers et al.
(Continued)

FOREIGN PATENT DOCUMENTS

CN    102026442 A    4/2011
CN    102724792 A    10/2012
(Continued)

OTHER PUBLICATIONS

International Search Report Issued Jun. 14, 2021, in PCT/EP2021/061890, filed on May 5, 2021, 2 pages.
(Continued)

*Primary Examiner* — Jimmy T Vu
(74) *Attorney, Agent, or Firm* — Oblon, McClelland, Maier & Neustadt, L.L.P.

(57) ABSTRACT

A method for controlling a lighting system of a motor vehicle including a generator for generating a pulse-width modulated signal having a first peak intensity or a second peak intensity higher than the first peak intensity, and a light source. The method includes reception of an instruction to emit a light beam according to a given target luminous flux, selection of a peak intensity from the first and second peak intensities depending on the given target luminous flux. Also included is determination of a target duty cycle of a pulse-width modulated signal having the selected peak intensity depending on the given target luminous flux and the efficiency of the light source, and generation of a target signal having the selected peak intensity and the determined target duty cycle and provision of the target signal to the light source.

20 Claims, 5 Drawing Sheets

(51) Int. Cl.
*B60Q 3/82* (2017.01)
*H05B 45/325* (2020.01)
*H05B 45/59* (2022.01)

(56) References Cited

U.S. PATENT DOCUMENTS

| | | | | |
|---|---|---|---|---|
| 2011/0062872 A1* | 3/2011 | Jin | ......................... | H05B 45/46 |
| | | | | 257/E21.531 |
| 2013/0127344 A1 | 5/2013 | Jin et al. | | |
| 2013/0307419 A1* | 11/2013 | Simonian | ............... | H05B 45/20 |
| | | | | 315/153 |
| 2019/0110343 A1* | 4/2019 | Van Kaathoven | ........................... | |
| | | | | H05B 45/3725 |

FOREIGN PATENT DOCUMENTS

| | | |
|---|---|---|
| CN | 103493590 A | 1/2014 |
| CN | 107801280 A | 3/2018 |
| CN | 109076663 A | 12/2018 |

OTHER PUBLICATIONS

Combined Chinese Office Action and Search Report issued Nov. 30, 2024, in corresponding Chinese Patent Application No. 202180033234.4 (with English Translation), 25 pages.

* cited by examiner

Fig. 4.
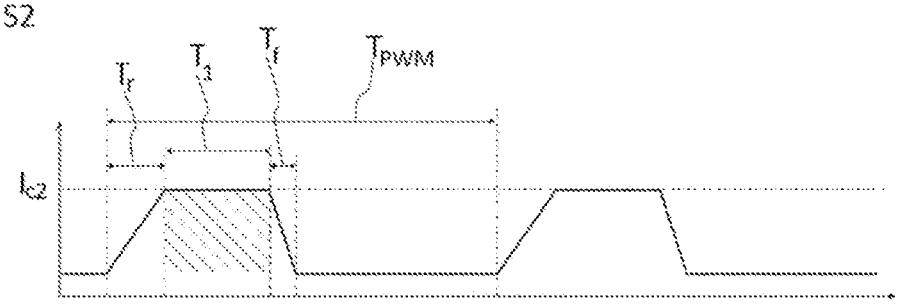
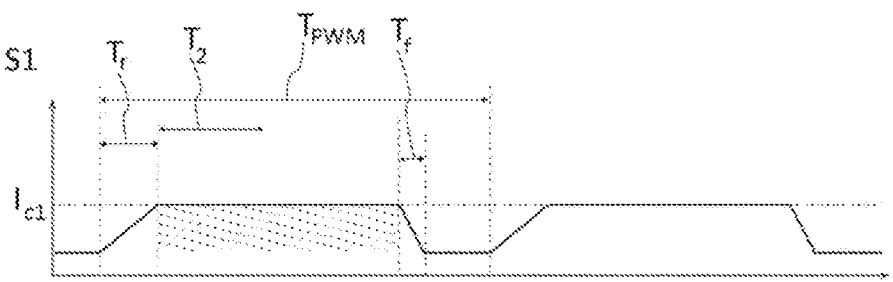

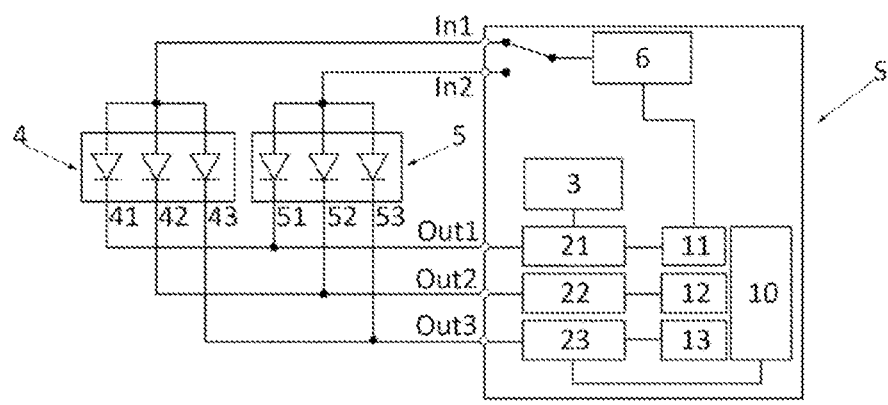

METHOD FOR CONTROLLING A LIGHTING SYSTEM OF A MOTOR VEHICLE

CROSS-REFERENCE TO RELATED APPLICATIONS

This application is a U.S. national stage application of PCT/EP2021/061890, filed on May 5, 2021, which is based upon and claims the benefit of priority from French patent application no. 20 04450, filed May 5, 2020, the entire contents of each of which are incorporated herein by reference.

TECHNICAL FIELD

The invention relates to the field of motor-vehicle lighting, and in particular to lighting for lighting the interior of a motor vehicle.

DESCRIPTION OF THE RELATED ART

Motor-vehicle lighting systems are conventionally controlled so as to emit a light beam having characteristics in accordance with a setpoint, which may for example be set by an occupant of the vehicle. This is for example the case for the lighting used to light the interior of a motor vehicle, by which an occupant of the vehicle may request to be illuminated with light of a given color and/or luminous flux. It is therefore necessary to provide a method for controlling the lighting system illuminating the passenger compartment that is precise and robust enough that the characteristics of the light beam emitted by this system correspond substantially to those required by the occupant.

As known, the light sources of the lighting systems of motor vehicles may be controlled by means of pulse-width-modulated signals, which are particularly suitable when these light sources are light-emitting diodes. Specifically, it has been established that the luminous flux emitted by a light-emitting diode is dependent on the power of the signal supplied to power it. It is therefore known to determine a value of the duty cycle of a pulse-width-modulated signal depending on the desired flux, and to power the diode with a signal having this determined duty cycle. Usually, this signal is a periodic signal comprising, in each period, a pulse formed by a ramp up to a peak amplitude, which is maintained for an activation time, and a ramp down to a zero value, which is maintained for a deactivation time until the next period. The luminous flux emitted by the diode is thus determined by the area of the pulse, and therefore by the various parameters, namely the rise time, the fall time, the activation time and the peak amplitude.

To avoid a noticeable flickering effect, the frequency of the signal must be particularly high, and for example higher than 300 Hz. Given the aforementioned need for precision, this frequency requires pulses to be generatable with a particularly short minimum activation time, for example one shorter than 50 ns, in particular so as to make it possible to emit a light beam of low luminous flux or indeed to make it possible to obtain a high luminous-flux and/or color resolution. However, the pulse-width-modulated-signal generators conventionally used are not capable of generating pulses with rise and/or fall times shorter than 100 ns. Consequently, the minimum area of the pulse generated by these known generators does not allow the aforementioned need for precision to be met.

SUMMARY

The present invention falls within this context, and aims to overcome the drawbacks mentioned by providing a method for controlling a lighting system of a motor vehicle, which is precise and robust enough that the characteristics of the light beam emitted by the lighting system correspond substantially to those required by the occupant, including when a low luminous flux or a small variation in the luminous flux and/or color of this light beam is required.

To these ends, one subject of the invention is a method for controlling a lighting system of a motor vehicle comprising:
  a. a pulse-width-modulated-signal generator, the generator being able to generate a pulsewidth-modulated signal having a first peak amplitude or a second peak amplitude higher than the first peak amplitude, and
  b. a light source arranged to emit a light beam with a luminous flux determined depending on said pulse-width-modulated signal.

According to the invention, the method comprises the following steps:
  a. reception, by the light source, of an instruction to emit a light beam with a given target luminous flux;
  b. selection of a peak amplitude among the first and second peak amplitudes, depending on the given target luminous flux;
  c. determination of a setpoint duty cycle for a pulse-width-modulated signal having the selected peak amplitude, depending on the given target luminous flux and on the efficacy of the light source; and
  d. generation of a pulse-width-modulated setpoint signal having the selected peak amplitude and the determined setpoint duty cycle, and delivery to the light source of said pulsewidth-modulated setpoint signal.

Thus, for one and the same given target intensity, it is possible to generate either a first pulse-width-modulated signal, the pulses of which, to the first peak amplitude, have a first activation time determined depending on this target intensity, on the first peak amplitude and, directly or indirectly, on the efficacy of the light source for this first peak amplitude, or a second pulse-width-modulated signal, the pulses of which, to the second peak amplitude, have a second activation time (necessarily shorter than the first) determined depending on this target intensity, on the second peak amplitude (which is higher than the first peak amplitude) and, directly or indirectly, on the efficacy of the light source for this second peak amplitude. Specifically, it has been observed that the efficacy of a light source, namely the ratio between the luminous flux actually emitted by the source and the electrical power required for the target light intensity, decreases as the peak amplitude of the current delivered thereto increases.

It will therefore be understood that, according to the invention, the luminous flux of the beam emitted by the light source remains identical, irrespectively of whether the first signal or the second signal is delivered thereto and regardless of its efficacy. Hence, it is possible to select either of the first and second peak amplitudes, depending on the required target luminous flux. Thus, when this required luminous flux is particularly low, or indeed when a small variation in the luminous flux is required, the first peak amplitude will for example be selected, so as to make it possible to generate a signal the pulses of which have an activation time long enough for them to be producible by the generator.

By pulse-width-modulated signal, what is meant is a periodic signal characterized in that, over a period, it comprises a pulse having a peak amplitude for a given duration called the activation time (reference is also made to pulse-width modulation or PWM). The ratio between the activation time and the period is called the duty cycle of this signal.

Advantageously, the light source is powered electrically by means of the pulse-width-modulated setpoint signal. Where appropriate, the luminous flux of the beam emitted by the light source is determined using the following equation.

$$Y = \frac{Y_{max} \cdot T_{onC}}{T_{PWM}}$$

where Y is the value of the luminous flux emitted by the light source, $Y_{max}$ is the maximum luminous flux that the light source is capable of delivering for the selected peak amplitude, $T_{PWM}$ is the period of the setpoint signal, and $T_{onC}$ is the activation time of one pulse of the setpoint signal. It will be noted that this maximum luminous flux is dependent on the efficacy of the light source for the selected peak amplitude.

In one embodiment of the invention, the lighting system comprises three light sources, each source being able to emit a light beam of a predetermined color. Where appropriate, the step of reception of an instruction to emit comprises reception of an instruction for the lighting system to emit a light beam with a given color and a given target overall luminous flux. This step may optionally further comprise determination of a given target luminous flux for each of the light sources, on the basis of said color and given overall luminous flux. For example, the light sources may be semiconductor light-emitting chips, each able to emit a light beam of red, green and blue color respectively. Where appropriate, the chips will possibly be arranged in the vicinity of one another to form an RGB lighting unit (RGB standing for Red, Green, Blue).

Advantageously, the method comprises a step of determination of a setpoint duty cycle and a step of generation and of delivery of a setpoint signal for each of the light sources of the lighting system. In other words, for each light source of the lighting system, depending on the target luminous flux determined for this light source, and on the basis of the received instruction and, directly or indirectly, of the efficacy of this light source, a setpoint duty cycle is determined for a PWM signal having a selected peak amplitude, and a PWM setpoint signal having this selected peak amplitude and this determined setpoint duty cycle is generated, which signal is specific to this light source and delivered thereto.

Advantageously, for each light source, the setpoint duty cycle is determined so that the color and the luminous flux of the sum of the light beams emitted by the three light sources correspond substantially to the given color and to the given overall luminous flux.

For example, it is possible to consider that each of the light sources is able to emit a light beam of a different predetermined color depending on whether it is supplied with a PWM signal having the first or second peak amplitude. In other words, the coordinates, in a color space, of the predetermined color of the light beam emittable by each light source vary depending on the selected peak amplitude and depending on the efficacy of this light source for this selected peak amplitude. The step of determination of the setpoint duty cycle, for each light source, may thus comprise determination, for the selected peak value, of an average luminous flux that this light source must emit for the centroid of the coordinates of the predetermined colors, weighted by these average luminous fluxes, to correspond to the given color of the received instruction, and for the luminous flux of the sum of the light beams thus emitted to be substantially equal to the overall luminous flux. Each setpoint duty cycle may then be determined, for each of the light sources, by the ratio between the average luminous flux determined for this light source and the maximum luminous flux obtained for this light source with the selected peak amplitude, this maximum luminous flux being dependent on the efficacy of this light source.

If so desired, the step of selection of the peak amplitude is common to all the light sources in the lighting system. In other words, the method comprises a single step of selection of a peak amplitude and the setpoint signals generated for each of the light sources have the same selected peak amplitude.

For example, the step of selection of the peak amplitude may comprise comparison of the given overall luminous flux with a predetermined threshold value, the first peak amplitude being selected if the overall luminous flux is lower than, and especially lower than or equal to, said threshold value and the second peak amplitude being selected if the overall luminous flux is higher than said threshold value. This characteristic makes it possible to obtain a peak amplitude rapidly, and economically in terms of computation time.

According to another example, the step of selection of the peak amplitude may comprise comparison of the lowest value of the target luminous fluxes determined for each of the light sources of the lighting system with a predetermined threshold value, the first peak amplitude being selected if this lowest value is lower than said threshold value and the second peak amplitude being selected if said lowest value is higher than said threshold value. This feature allows a particularly high color resolution to be achieved.

As a variant, the method may comprise a step of selection of the peak amplitude for each of the light sources of the lighting system, for example depending on the target luminous flux determined for this light source.

In one embodiment of the invention, the three light sources form a first lighting unit of the lighting system, and the lighting system comprises a second lighting unit comprising three light sources each able to emit a light beam of a predetermined color. In particular, each light source of the second unit may be able to emit a light beam of a color substantially identical to the color of the light beam emittable by one of the light sources of the first lighting unit. Where appropriate, the method may comprise a step of determination of a setpoint duty cycle and a step of generation and of delivery of a setpoint signal for each of the light sources of each of the lighting units of the lighting system, the steps of delivery of a setpoint signal for the light sources of each lighting unit of the lighting system being time multiplexed. In other words, setpoint signals are alternately and periodically delivered to the light sources of the first lighting unit, and to the light sources of the second lighting unit, the setpoint signals being delivered to the light sources of the same lighting unit simultaneously. This feature makes it possible to simplify production of the lighting system and to use fewer ports of a controller controlling the power supplied to the lighting units. Where appropriate, the steps of determination of the setpoint duty cycle for each light source are repeated in each period of the multiplexing.

Advantageously, the lighting system comprises a single controller comprising three generators of pulse-width-modulated signals, each generator being intended to generate one setpoint signal and to deliver this setpoint signal to one of the light sources of each lighting unit.

For example, the controller comprises two inputs that may each be selectively activated or deactivated to permit the passage of an electric current, and three outputs each intended to receive a setpoint signal generated by one of the generators. Each input of the controller is commonly connected to one of the lighting units, and hence said input is connected to the light sources, and especially to the anodes of the light sources, of this lighting unit. Each output is commonly connected to one of the light sources, and especially to the cathode of one of the light sources, of each lighting unit. In particular, each output is commonly connected to the light sources of the lighting units able to emit a light beam of a substantially identical color. The controller periodically activates and deactivates each of the inputs so that one is activated while the other is deactivated. Thus, each of the light sources of each lighting unit receives a setpoint signal for a given time, during which it emits a light beam and during which the light sources of the other lighting unit do not emit a light beam. Where appropriate, the frequency of activation and deactivation of the inputs is higher than 500 Hz, so that the alternation of emission and of deactivation of the light sources is not perceptible to the human eye.

The invention also relates to a lighting system of a motor vehicle, comprising at least one pulse-width-modulated-signal generator and a light source arranged to emit a light beam with a luminous flux determined depending on said pulse-width-modulated signal, the lighting system being arranged to implement the method according to the invention.

Advantageously, the lighting system is a lighting system for the interior of the motor vehicle.

BRIEF DESCRIPTION OF THE DRAWINGS

The present invention will now be described by way of examples that are merely illustrative and that in no way limit the scope of the invention, and with reference to the accompanying illustrations, in which:

FIG. 4 shows examples of pulse-width-modulated signals generated according to the method of [FIG. 2]; and FIG. 5 shows, schematically and partially, a lighting system of a motor vehicle according to a second embodiment of the invention.

DETAILED DESCRIPTION

In the following description, elements that are identical in terms of structure or in terms of function and that appear in various figures have been designated with the same reference sign, unless otherwise indicated.

Figure 1:
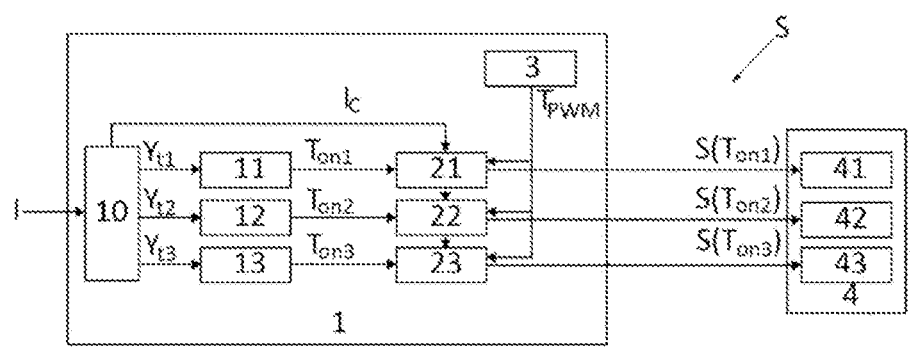
FIG. 1 shows, schematically and partially, a lighting system of a motor vehicle according to a first embodiment of the invention.

FIG. 1 shows a lighting system S according to a first embodiment of the invention, the system S forming a system for lighting the interior of a motor vehicle.

To this end, the system S comprises a controller 1 provided with three pulse-width-modulated-signal generators 21, 22, 23 and three light sources 41, 42, 43. Each of the generators 21, 22 and 23 powers one of the light sources 41, 42 and 43.

Each of the light sources 41, 42 and 43 is a semiconductor chip able to emit a light beam of red, green and blue color, respectively. These three light sources are placed in the vicinity of one another to form an RGB light-emitting diode 4.

Although the example of [FIG. 1] shows only a single RGB light-emitting diode 4, provision will possibly be made, without departing from the scope of the invention, for the lighting system S to comprise a plurality of RGB light-emitting diodes arranged in various locations in the passenger compartment of the motor vehicle.

The controller 1 is arranged to receive, for example from a central computer of the motor vehicle, instructions to emit I, requiring the RGB light-emitting diode 4 to emit a light beam of a given color C and of a given overall luminous flux $Y_G$. Upon receipt of an instruction I, the controller 1 is arranged to control the generators 21, 22 and 23 so that each generator generates, from a periodic signal delivered by an oscillator 3, a pulse-width-modulated signal for powering one of the light sources 41, 42 and 43. Each light source thus emits a light beam having a luminous flux such that the sum of the three light beams forms, by additive synthesis, a light beam having the given color C and the given overall luminous flux $Y_G$.

With reference to [FIG. 2], a method according to one embodiment of the invention will now be described, said method being implemented by the lighting system S so that the color of the light beam emitted by the RGB diode 4 corresponds substantially to the given color required by the control instruction I.

The controller 1 comprises a computer 10 arranged to receive the instruction to emit I and to select, in a first step E1, a peak electrical amplitude $I_c$ from two peak amplitude values $I_{c1}$ and $I_{c2}$, depending on the required value of the overall luminous flux $Y_G$ specified in the instruction to emit I. The first value $I_{c1}$ will be selected if $Y_G$ is lower than or equal to $Y_s$ and the second value $I_{c2}$ will be selected if $Y_G$ is higher than $Y_s$. It will be noted that the value $I_{c2}$ is higher than $I_{c1}$. For example, $I_{c1}$ will possibly be 1 mA and $I_{c2}$ will possibly be 20 mA.

The computer 10 thus transmits this selected value $I_c$ to the generators 21, 22 and 23, so as to ensure that the signals have the selected peak amplitude.

In a second step E2, computers 11, 12 and 13 determine, each in a step E21, E22 and E23 specific to each light source 41, 42 and 43, an average luminous flux $Y_{m1}$, $Y_{m2}$, $Y_{m3}$ that this light source must emit for the light beam emitted by the RGB diode 4 to have the required color C and the required overall luminous flux $Y_G$ specified in the instruction to emit I, depending on the selected value of the peak electrical amplitude $I_c$.

Figure 3:
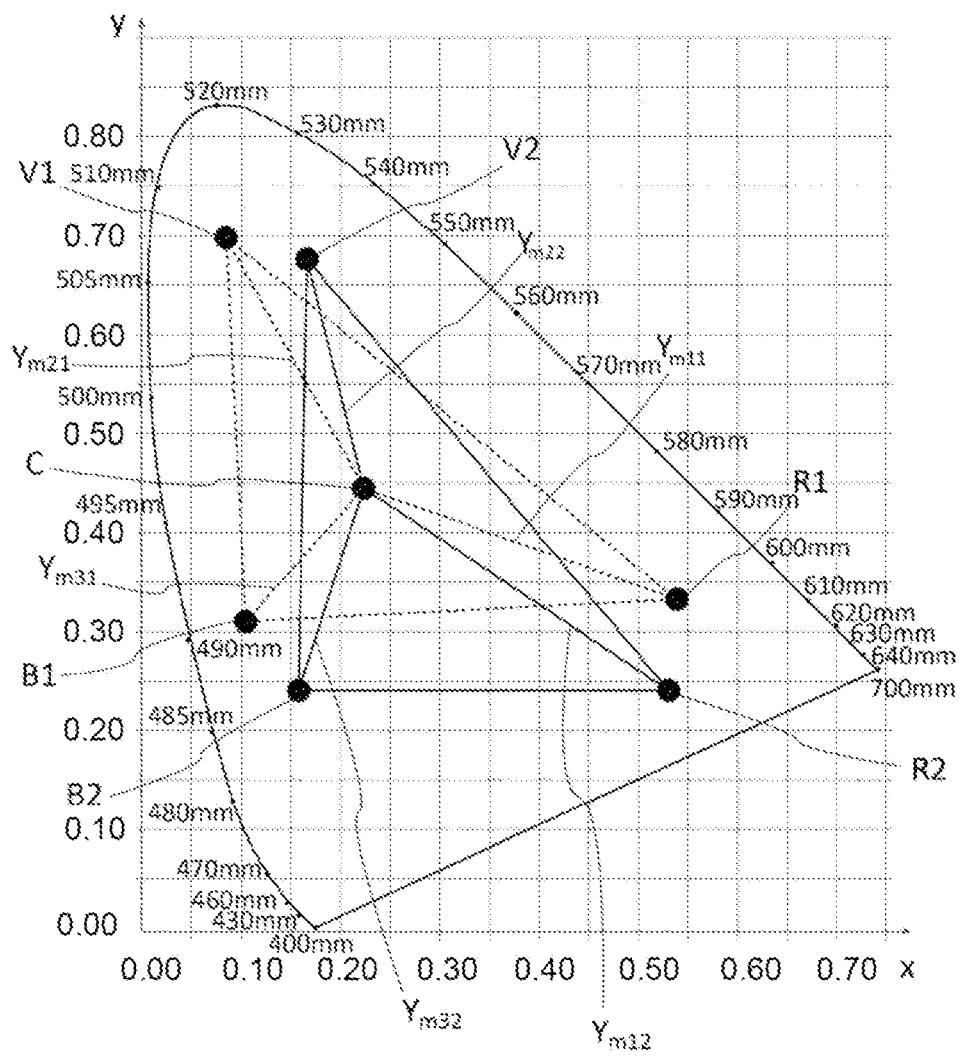
FIG. 3 shows a chromaticity diagram employed in the method of [FIG. 2]

FIG. 3 shows a chromaticity diagram. The colors R1, G1 and B1 of the light beams that the light sources 41, 42 and 43 are capable of emitting when they are each powered with a pulse-width-modulated signal having the peak value Ic1 and a duty cycle of 100% have been identified in this diagram. It will be noted that, for this duty cycle of 100% and this peak amplitude $I_{c1}$, each light source emits a light beam of maximum luminous flux $Y_{max1c1}$, $Y_{max2c1}$ and $Y_{max3c1}$ dependent on the efficacy of this light source at this peak amplitude $I_{c1}$. The colors R2, G2 and B2 of the luminous fluxes that the light sources 41, 42 and 43 are capable of emitting when they are each powered with a pulse-width-modulated signal having the peak value $I_{c2}$ and a duty cycle of 100% have been identified in this diagram. Similarly, for this duty cycle of 100% and this peak amplitude $I_{c2}$, each light source emits a light beam of maximum luminous flux $Y_{max1c2}$, $Y_{max2c2}$ and $Y_{max3c2}$ dependent on the efficacy of this light source at this peak amplitude $I_{c1}$. It may thus be seen that the coordinates of the colors of the light beam emittable by a light source differ depending on the selected peak amplitude. Lastly, one example of a required given color C specified in a received instruction I has been shown. The position of this color C may, on the one hand, be considered to be a centroid of the colors R1, G1 and B1 weighted by weights corresponding to the luminous fluxes $Y_{m11}$, $Y_{m22}$ and $Y_{m31}$ sought for the first peak amplitude $I_{c2}$, respectively. On the other hand, the position of this color C may also be considered to be a centroid of the colors R2, G2 and B2 weighted by weights corresponding to the luminous fluxes $Y_{m21}$, $Y_{m22}$ and $Y_{m32}$ sought for the second peak amplitude $I_{C2}$.

The average luminous fluxes $Y_{m1}$, $Y_{m2}$ and $Y_{m3}$ will thus possibly be determined, depending on the selected peak amplitude $I_c$, by selecting a color triplet R1,G1,B1 or a color triplet R2,G2,B2, and searching for the weights by which these colors must be weighted for their centroid to correspond to the required color C, and furthermore for the sum of the luminous fluxes to substantially correspond to the required overall luminous flux $Y_g$.

In a third step E3, the computers 11, 12 and 13 determine, each in a step $E_{31}$, $E_{32}$ and $E_{33}$ specific to each light source 41, 42 and 43, a setpoint duty cycle or, as in the present case, an activation time $T_{on1}$, $T_{on2}$ and $T_{on3}$, via the ratio between the luminous flux $Y_{m1}$, $Y_{m2}$ and $Y_{m3}$ determined for each light source and the maximum luminous flux of this source for the selected peak amplitude. Each computer 11, 12 and 13 then delivers the activation time that it determined to one of the generators 21, 22 and 23.

In a fourth step E4, each generator 21, 22 and 23 generates, in a step E41, E42 and E43 specific to each light source 41, 42 and 43, from the periodic signal delivered by the oscillator 3, a pulse-width-modulated signal S ($T_{on1}$), S ($T_{on2}$) and S ($T_{on3}$) the peak amplitude of which is $I_c$ and the activation time of which is $T_{on1}$, $T_{on2}$ and $T_{on3}$, respectively, then delivers this signal to one of the light sources 41, 42 and 43.

FIG. 4 shows two examples of pulse-width-modulated signals S1 and S2, one with the peak amplitude $I_{C1}$ and the other with the peak amplitude $I_{C2}$.

Each of these signals S1 and S2 is a periodic signal of period TPWM and comprises, in each period, a pulse formed from a ramp up, of duration $T_r$, to the value of the peak amplitude $I_{C1}$, $I_{C2}$, which is maintained for an activation time $T_1$, $T_2$, and followed by a ramp down, of duration $T_f$, to a zero value, respectively. It will be noted that the average amplitudes of these signals S1 and S2, corresponding substantially to the hatched areas, are different. Specifically, due to the difference in efficacy of the light sources at the two peak amplitudes capable of being selected, the sources having a higher efficacy at high peak amplitudes, it is necessary to modify the current delivered to these sources depending on the selected peak amplitude. It will be noted that, when the received instruction I specifies a particularly low overall luminous flux or even a color such that the target luminous flux of one of the sources is particularly low, the activation time $T_2$ of the signal S2 may be of the order of the rise and fall times $T_r$, $T_f$ or even shorter therethan. In this case, an average amplitude of the signal actually generated corresponding substantially to the determined average amplitude cannot be obtained. Furthermore, the chromatic behavior of the sources during the rise and fall times is unpredictable. The invention thus allows the generators to generate a signal S1 the activation time $T_1$ of which is, in this case, substantially longer than the rise and fall times $T_r$, $T_f$, so that the average amplitude of the signal actually generated substantially corresponds to the determined average amplitude. In addition, in this case, the chromatic impact of the rise and fall times is minimized.

FIG. 5 shows a lighting system S according to a second embodiment of the invention, the system S forming a system for lighting the interior of a motor vehicle.

To this end, the system S comprises a controller 1, a first lighting unit 4 comprising three light sources 41, 42, 43 and a second lighting unit 5 comprising three light sources 51, 52 and 53.

Each of the light sources 41, 42 and 43 is a semiconductor chip able to emit a light beam of red, green and blue color, respectively. These three light sources are placed in the vicinity of one another to form an RGB light-emitting diode 4. Likewise, each of the light sources 51, 52 and 53 is a semiconductor chip able to emit a light beam of red, green and blue color, respectively. These three light sources are placed in the vicinity of one another to form an RGB light-emitting diode 5.

Equivalently to the first embodiment, the controller 1 is arranged to receive, for example from a central computer of the motor vehicle, instructions to emit I, requiring the RGB light-emitting diodes 4 and 5 to emit a light beam of a given color C and of a given overall luminous flux $Y_G$.

Figure 2:
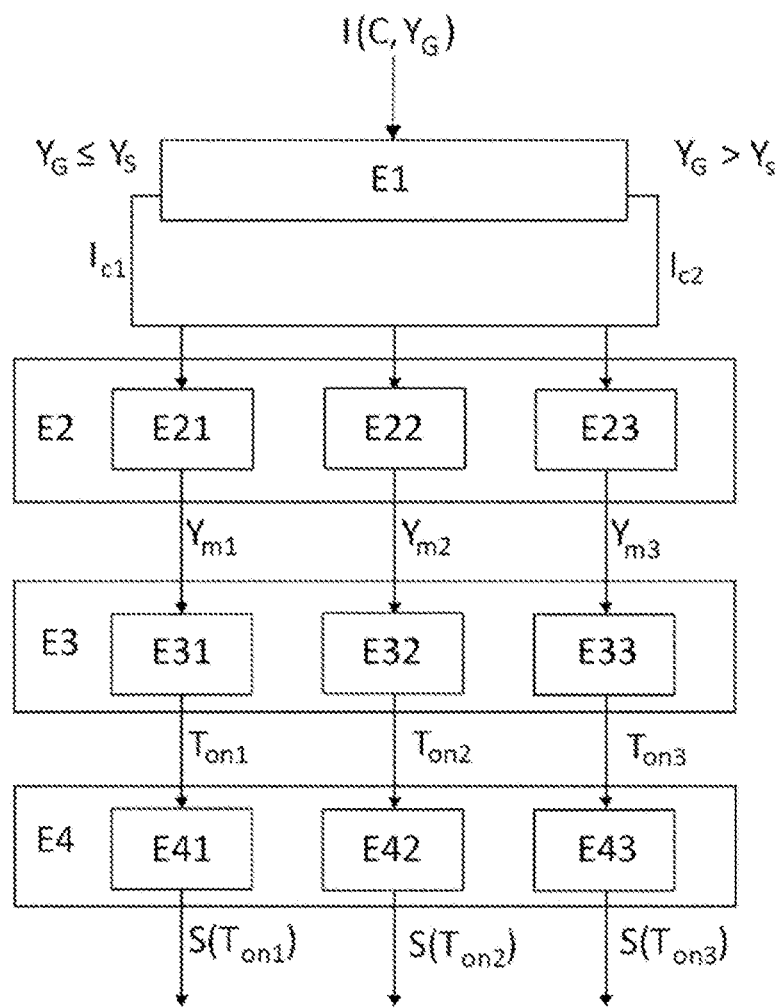
FIG. 2 shows a method for controlling the lighting system of [FIG. 1] according to one embodiment of the invention.

To this end, the controller 1 comprises computers 11, 12 and 13, three generators 21, 22, 23 of pulse-width-modulated signals and an oscillator 3, which are arranged to implement together the steps E0 to E4 illustrated in [FIG. 2].

However, unlike in [FIG. 1] and [FIG. 2], the controller 1 comprises a switching unit 6 arranged so that the generators 21, 22 and 23 deliver said pulse-width-modulated signals to the light sources of the RGB light-emitting diodes 4 and 5 in a multiplexed manner. The controller 1 has two inputs In1 and In2, each commonly connected to the anodes of the light sources 41, 42 and 43 and 51, 52 and 53 of each RGB light-emitting diode 4 and 5, respectively. Each input In1 and In2 may be activated or deactivated selectively by the switching unit 6 so as to permit the passage of a current through the RGB diode to which it is connected.

The controller 1 has three outputs Out1, Out2 and Out3. Each output is commonly connected to the cathodes of the light sources of the RGB diodes 4 and 5 able to emit a light beam of the same color. In particular, the output Out1 is connected to the cathodes of the light sources 41 and 51, the output Out2 is connected to the cathodes of the light sources 42 and 52 and the output Out3 is connected to the cathodes of the light sources 43 and 53. Each output Out1, Out2 and Out3 is further connected to one of the generators so as to receive a pulse-width-modulated signal delivered by this generator and to transmit it to the light sources to which it is connected.

The switching unit 6 periodically and alternately controls activation and deactivation of the inputs In1 and In2 so that, when one is activated, the other is deactivated. Thus, the generators 11, 12 and 13 deliver pulse-width-modulated signals alternately to the RGB diode 4 and to the RGB diode 5.

The switching unit moreover synchronously controls the computers 11, 12 and 13 so that the implementation of steps E1 to E4 is tailored to the RGB diode connected to the activated input. In particular, the switching unit controls the computers 11, 12 and 13 so that the setpoint duty cycles are determined depending on the efficacies of the light sources of the RGB diode connected to the activated input.

Provision will possibly be made, without departing from the scope of the invention, for the lighting system S to comprise more than two RGB light-emitting diodes arranged at various locations in the passenger compartment of the motor vehicle and to which light-emitting diodes pulse-width-modulated signals are delivered in a multiplexed manner.

It will be noted that, in the described examples, all of the computers of the controller 1 may be effected by the same component, an integrated circuit for example.

The above description clearly explains how the invention allows the objectives that were set therefor, namely preservation of a satisfactory precision in respect of the luminous flux and/or color of a light beam emitted by a light source of a lighting system of a motor vehicle, including when a low luminous flux or a small variation in the luminous flux is required, to be met through provision of a method for controlling the lighting system that allows pulsewidth-modulated signals the peak amplitude of which is suitable for this required luminous flux to be generated.

In any event, the invention should not be regarded as being limited to the embodiments specifically described in this document, and extends, in particular, to any equivalent means and to any technically operative combination of these means. It may in particular be envisioned to employ the described lighting system and method in fields of motor-vehicle lighting other than the one described, and for example in fields such as lights for lighting the road or signaling lights. It may also be envisioned to select the value of the peak amplitude in other ways, and in particular to select a different peak-amplitude value for each light source.

The invention claimed is:

1. A method for controlling a lighting system of a motor vehicle, comprising a pulse-width-modulated-signal generator, the generator being able to generate a pulse-width-modulated signal having a first peak amplitude or a second peak amplitude higher than the first peak amplitude, and a light source arranged to emit a light beam with a luminous flux determined depending on said pulse-width-modulated signal, wherein the method comprises the following steps:
reception, by the light source, of an instruction for the light source to emit a light beam with a given target luminous flux;
selection of either the first peak amplitude or the second peak amplitude to be applied to the light source based on a level of the given target luminous flux;
determination of a setpoint duty cycle for a pulse-width-modulated signal having the selected peak amplitude, depending on the given target luminous flux and on the efficacy of the light source; and
generation of a pulse-width-modulated setpoint signal having the selected peak amplitude and the determined setpoint duty cycle, and delivery to the light source of said pulse-width-modulated setpoint signal to cause the light source to emit the light beam with the given target luminous flux.

2. The method as claimed in claim 1, wherein the lighting system comprising two additional light sources, each of the light source and additional light sources being able to emit a light beam of a predetermined color, wherein the step of reception of an instruction to emit comprises reception by each respective light source of an instruction such that the instructions cause the lighting system to emit a light beam with a given color and with a given overall luminous flux.

3. The method as claimed in claim 2, wherein the method further comprising a step of determination of a setpoint duty cycle, and a step of generation and of delivery of a setpoint signal for each of the light sources of the lighting system.

4. The method as claimed in claim 3, wherein, for each light source, the setpoint duty cycle is determined so that the color and the luminous flux of the sum of the light beams emitted by the three light sources correspond substantially to the given color and to the given overall luminous flux.

5. The method as claimed in claim 2, wherein the step of selection of the peak amplitude is common to all the light sources of the lighting system.

6. The method as claimed in claim 5, wherein the step of selection of the peak amplitude comprises comparison of the given overall luminous flux with a predetermined threshold value, the first peak amplitude being selected if the overall luminous flux is lower than said threshold value and the second peak amplitude being selected if the overall luminous flux is higher than said threshold value.

7. A method for controlling a lighting system of a motor vehicle, comprising a pulse-width-modulated-signal generator, the generator being able to generate a pulse-width-modulated signal having a first peak amplitude or a second peak amplitude higher than the first peak amplitude, and a light source arranged to emit a light beam with a luminous flux determined depending on said pulse-width-modulated signal, wherein the method comprises the following steps:
reception, by the light source, of an instruction to emit a light beam with a given target luminous flux;
selection of a peak amplitude among the first and second peak amplitudes, depending on the given target luminous flux;
determination of a setpoint duty cycle for a pulse-width-modulated signal having the selected peak amplitude, depending on the given target luminous flux and on the efficacy of the light source; and
generation of a pulse-width-modulated setpoint signal having the selected peak amplitude and the determined setpoint duty cycle, and delivery to the light source of said pulse-width-modulated setpoint signal,
wherein the lighting system comprising two additional light sources, each of the light source and additional light sources being able to emit a light beam of a predetermined color, wherein the step of reception of an instruction to emit comprises reception by each respective light source of an instruction such that the instructions cause the lighting system to emit a light beam with a given color and with a given overall luminous flux,
wherein the method further comprising a step of determination of a setpoint duty cycle, and a step of generation and of delivery of a setpoint signal for each of the light sources of the lighting system
wherein, for each light source, the setpoint duty cycle is determined so that the color and the luminous flux of the sum of the light beams emitted by the three light sources correspond substantially to the given color and to the given overall luminous flux, and
wherein the method further comprising a step of determination of a given target light intensity for each of the light sources of the lighting system on the basis of said given color and given overall luminous flux, wherein the step of selection of the peak amplitude comprises comparison of the lowest value of the target luminous fluxes determined for each of the light sources with a predetermined threshold value, the first peak amplitude being selected if said lowest value is lower than said threshold value and the second peak amplitude being selected if said lowest value is higher than said threshold value.

8. A method for controlling a lighting system of a motor vehicle, comprising a pulse-width-modulated-signal generator, the generator being able to generate a pulse-width-modulated signal having a first peak amplitude or a second peak amplitude higher than the first peak amplitude, and a light source arranged to emit a light beam with a luminous flux determined depending on said pulse-width-modulated signal, wherein the method comprises the following steps:
  reception, by the light source, of an instruction to emit a light beam with a given target luminous flux;
  selection of a peak amplitude among the first and second peak amplitudes, depending on the given target luminous flux;
  determination of a setpoint duty cycle for a pulse-width-modulated signal having the selected peak amplitude, depending on the given target luminous flux and on the efficacy of the light source; and
  generation of a pulse-width-modulated setpoint signal having the selected peak amplitude and the determined setpoint duty cycle, and delivery to the light source of said pulse-width-modulated setpoint signal,
  wherein the lighting system comprising three light sources, each source being able to emit a light beam of a predetermined color, wherein the step of reception of an instruction to emit comprises reception of an instruction for the lighting system to emit a light beam with a given color and with a given overall luminous flux,
  wherein the three light sources forming a first lighting unit of the lighting system, and the lighting system comprising a second lighting unit comprising three light sources each able to emit a light beam of a predetermined color, and
  wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

9. The method as claimed in claim 8, wherein the lighting system comprising a single controller comprising three generators of pulse-width-modulated signals, each generator being intended to generate one setpoint signal and to deliver this setpoint signal to one of the light sources of each lighting unit.

10. A lighting system of a motor vehicle, comprising at least one pulse-width-modulated-signal generator and a light source arranged to emit a light beam with a luminous flux determined depending on said pulse-width-modulated signal, the lighting system being arranged to implement the method as claimed in claim 1.

11. The lighting system as claimed in claim 10, wherein the lighting system being a lighting system for lighting the interior of the motor vehicle.

12. The method as claimed in claim 3, wherein the step of selection of the peak amplitude is common to all the light sources of the lighting system.

13. The method as claimed in claim 4, wherein the step of selection of the peak amplitude is common to all the light sources of the lighting system.

14. The method as claimed in claim 3, the three light sources forming a first lighting unit of the lighting system, and the lighting system comprising a second lighting unit comprising three light sources each able to emit a light beam of a predetermined color, the method comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

15. The method as claimed in claim 3, wherein the three light sources forming a first lighting unit of the lighting system, and the lighting system comprising a second lighting unit comprising three light sources each able to emit a light beam of a predetermined color, wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

16. The method as claimed in claim 4, wherein the three light sources forming a first lighting unit of the lighting system, and the lighting system comprising a second lighting unit comprising three light sources each able to emit a light beam of a predetermined color, wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

17. The method as claimed in claim 5, wherein the three light sources forming a first lighting unit of the lighting system, and the lighting system comprising a second lighting unit comprising three light sources each able to emit a light beam of a predetermined color, wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

18. The method as claimed in claim 6, wherein the three light sources forming a first lighting unit of the lighting system, and the lighting system comprising a second lighting unit comprising three light sources each able to emit a light beam of a predetermined color, wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

19. The method as claimed in claim 7, wherein the three light sources forming a first lighting unit of the lighting system, and the lighting system comprising a second lighting unit comprising three light sources each able to emit a light beam of a predetermined color, wherein the method further comprising a step of determination of a setpoint duty cycle and a step of generation and of delivery of a setpoint signal for each of the light sources of each of the lighting units of the lighting system, wherein the steps of delivery of a setpoint signal for the light sources of each lighting unit of the lighting system are time multiplexed.

20. A lighting system of a motor vehicle, comprising at least one pulse-width-modulated-signal generator and a light source arranged to emit a light beam with a luminous flux determined depending on said pulse-width-modulated signal, the lighting system being arranged to implement the method as claimed in claim 2.

* * * * *